July 1, 1941.  E. W. CARROLL  2,247,602
MEANS FOR ORIENTATING SEAMED FRUIT
Filed June 17, 1940  5 Sheets-Sheet 1

INVENTOR,
ELLSWORTH W. CARROLL.
BY
Lippincott & Metcalf
ATTORNEYS.

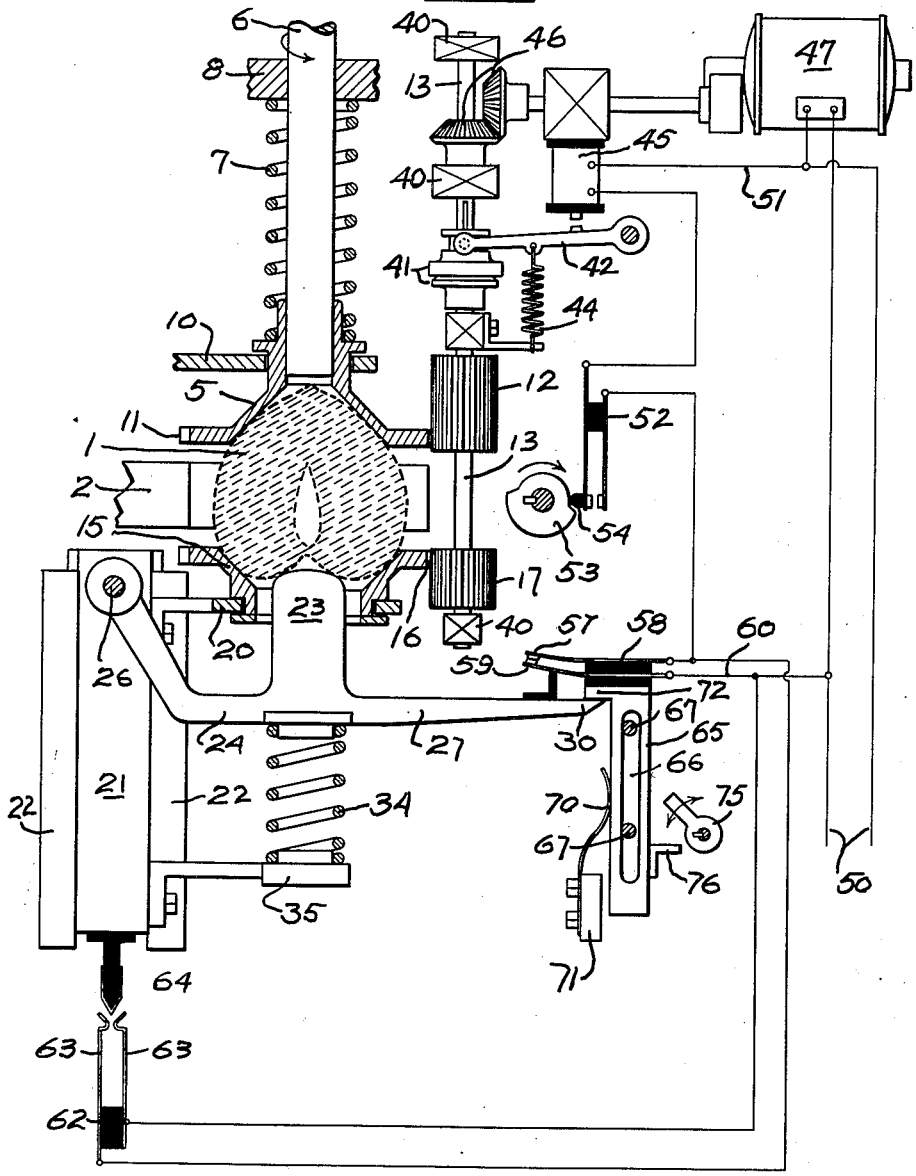

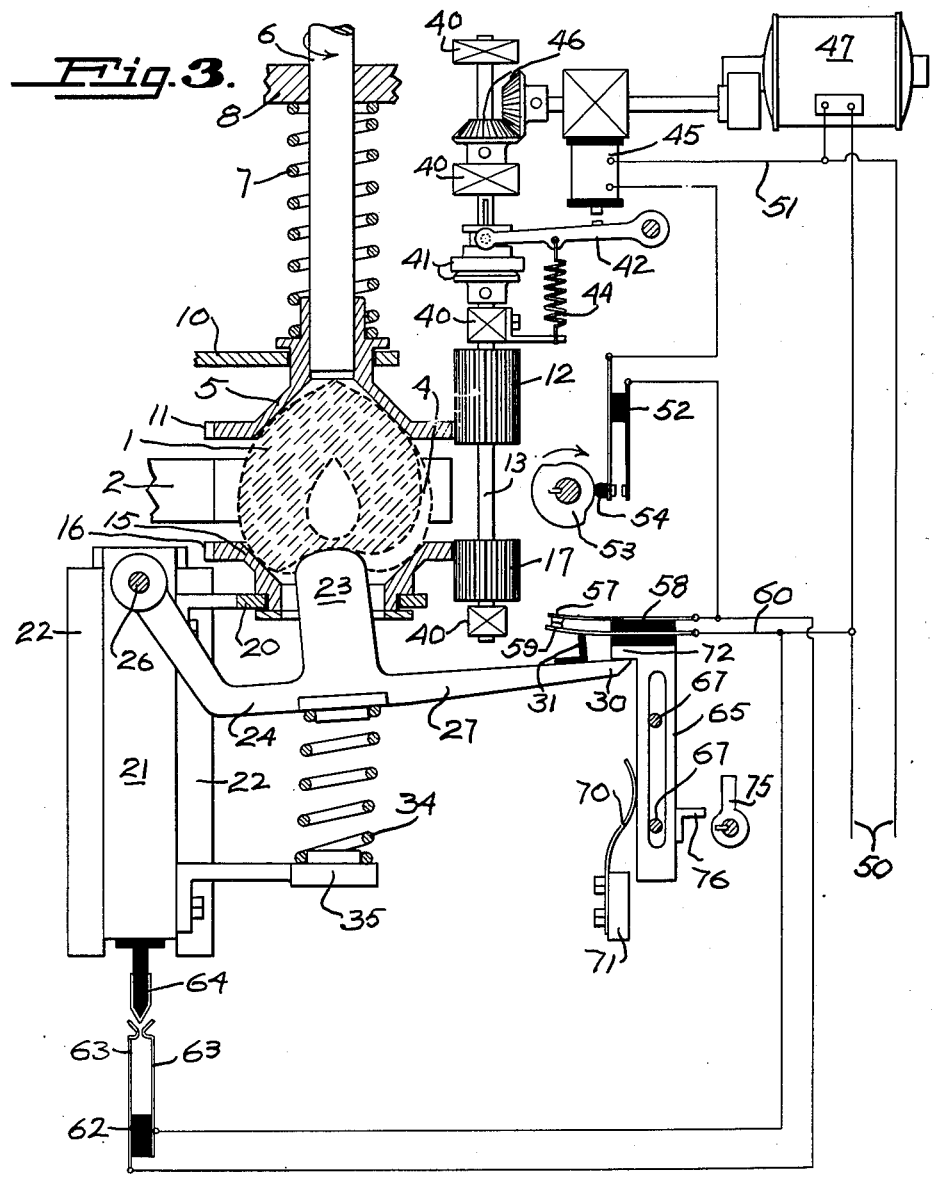
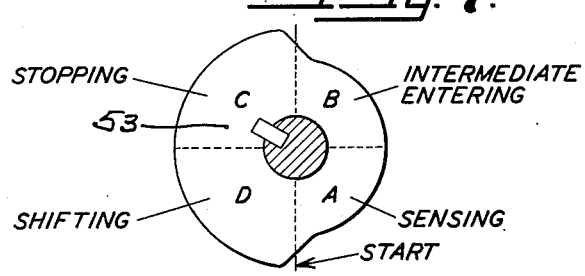

July 1, 1941. E. W. CARROLL 2,247,602
MEANS FOR ORIENTATING SEAMED FRUIT
Filed June 17, 1940 5 Sheets-Sheet 4

INVENTOR,
ELLSWORTH W. CARROLL.
BY
Lippincott & Metcalf
ATTORNEYS

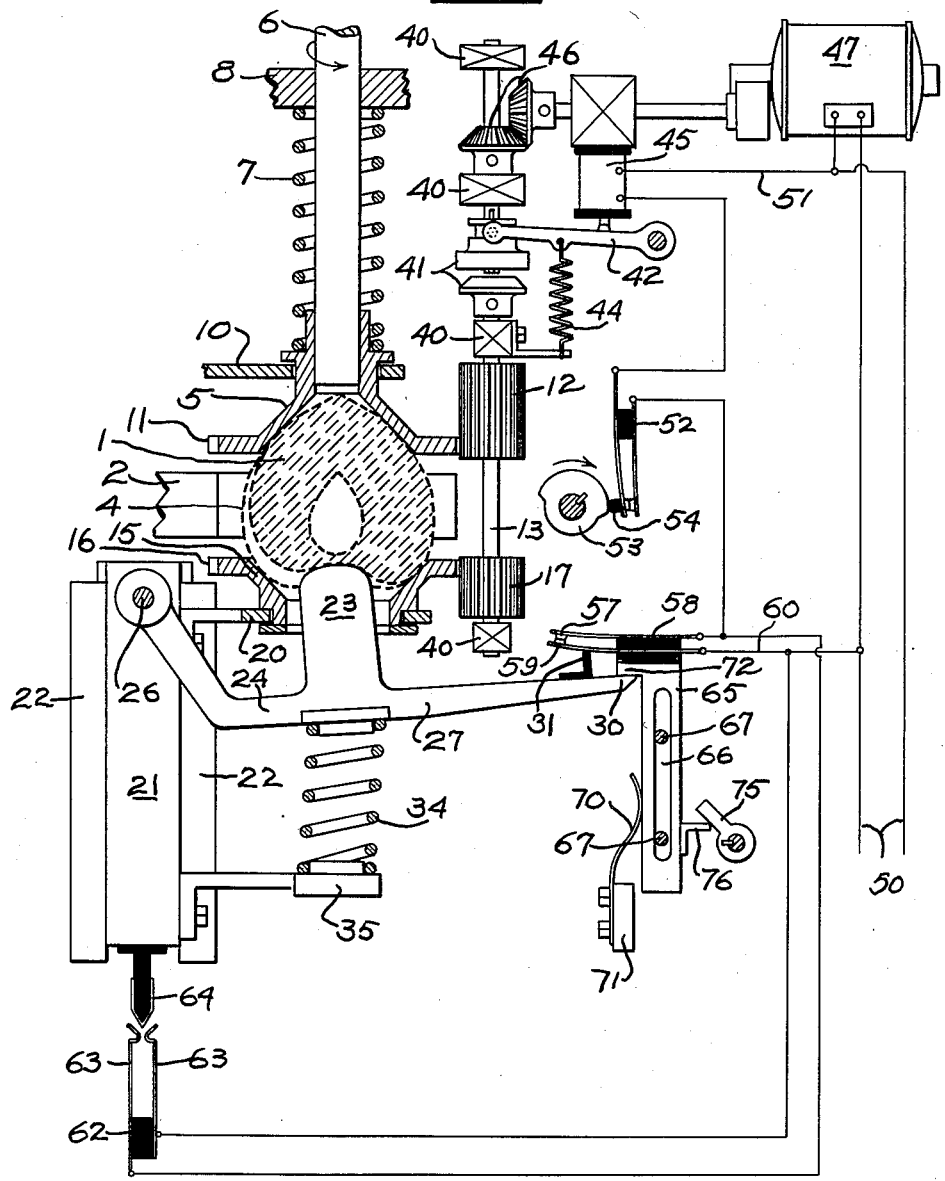

Patented July 1, 1941

2,247,602

UNITED STATES PATENT OFFICE 2,247,602

MEANS FOR ORIENTATING SEAMED FRUIT

Ellsworth W. Carroll, San Francisco, Calif., assignor to S & W Fine Foods, Inc., San Francisco, Calif., a corporation of California Application June 17, 1940, Serial No. 340,986

8 Claims. (Cl. 198—33)

My invention relates to fruit orientation, and more particularly to means and method of orientating fruit with particular reference to the seam thereof. My invention is particularly applicable for the orientation of all fruit similar to peaches and apricots in order that they may be cut or split along a line with particular reference to the seam and to the maximum width plane of the pit.

The main object of my invention is to provide a simple and efficient means and method of orientating a seamed fruit in proper position for cutting or splitting along a predetermined plane.

Other objects of my invention will be apparent or will be specifically pointed out in the description forming a part of this specification, but I do not limit myself to the embodiment of the invention herein described, as various forms may be adopted within the scope of the claims.

In the drawings:

Figs. 2, 3, 4 and 5 are views similar to Fig. 1, showing steps in the sequential operation of the device shown in Fig. 1, to orientate the fruit.

Fig. 7 is a diagram of the controlling switch cam.

In my copending prior application Serial No. 211,140, filed June 1, 1938, entitled "Full automatic orientator," I have described and claimed an automatic mechanism for the orientation of fruit, such as a peach, both in regard to the stem indent thereof and to the seam. The present invention has to do with the orientation of the fruit with respect to the seam alone, the fruit being delivered with the stem indent in a predetermined aspect, such stem indent orientation being preferably performed by the automatic mechanism disclosed and claimed in the above identified application.

Broadly, the present invention involves receiving the peach with the stem indent in a predetermined aspect, preferably down, but with the seam in any chance vertical plane. As I desire to turn the seam into a predetermined vertical plane, I utilize the contour of the stem indent as a guide for mechanically positioning the fruit with the seam in the desired vertical plane. This can be done because I have found that the stem indent of a seamed fruit is not generally circularly concave, but, is on the other hand very definitely ovally concave, that is, the stem indent has an oval periphery rather than a circular periphery. I have also found that the long axis of this oval stem indent is in the same plane as the seam. Thus, by revolving the fruit around the axis of the stem indent and by registering the stem indent with an oval pilot member, I am able to position the seam of the fruit as desired.

I have, however, found that the stem indents of orchard run fruit have varying depths and I therefore rotate the fruit to predetermine the depth of the stem indent to set up a reference point, and then automatically stop the fruit rotation when the stem indent contour registers with the contour of the pilot member.

Broadly, as to apparatus, I provide means for holding and rotating a fruit about an axis passing through the stem indent with the stem indent in a predetermined location. I then provide means to explore the depth of the stem indent and then, after a further revolution of the fruit, I provide means for stopping the rotation of the fruit when the pilot means again properly registers with the stem indent. Thus, I do not have to depend for cessation of rotation of my device on the actual depth of the stem indent but merely on the depth of the stem indent in relation to a preset reference point, this presetting taking place with each individual fruit.

Figure 1:
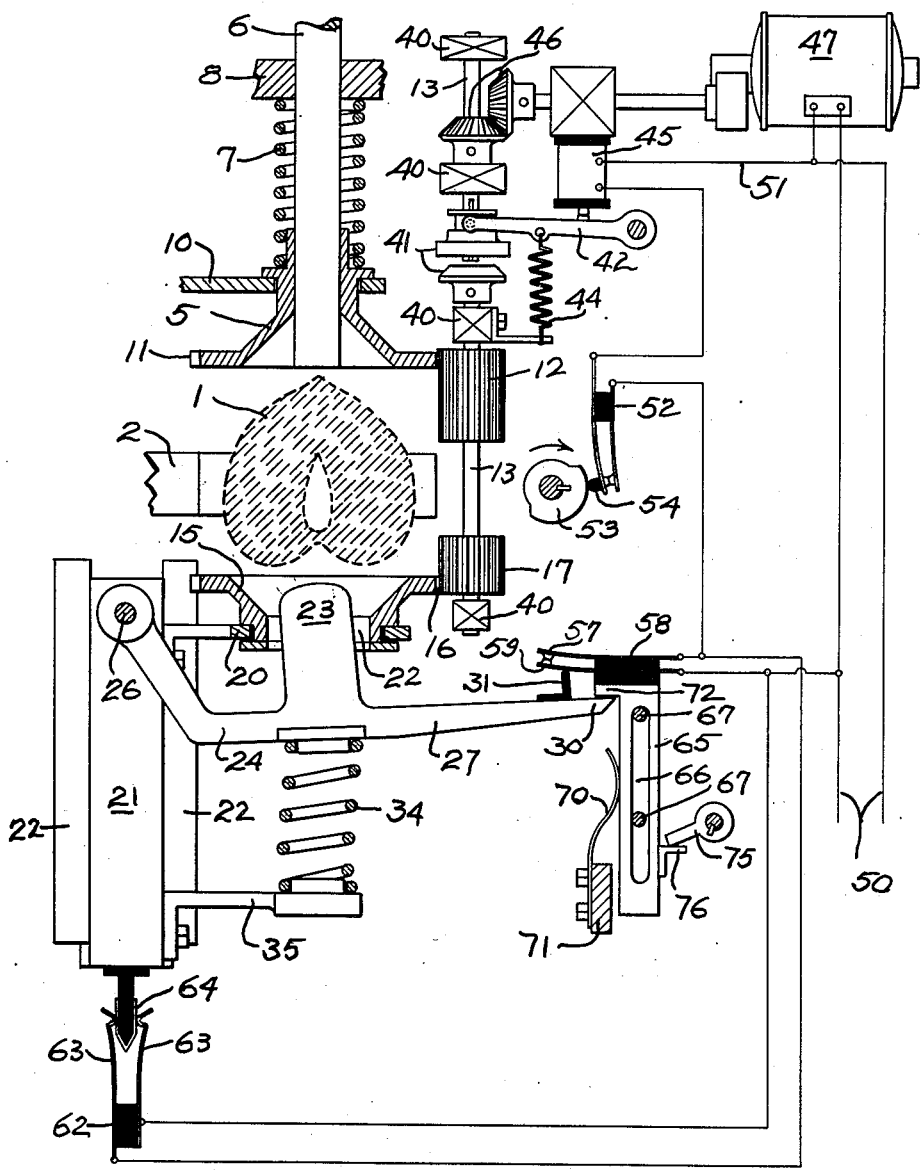
Fig. 1 is a vertical view; partly in section and partly in elevation and partly diagrammatic, showing a fruit orientator adapted to position a fruit, such as a peach, with the seam in a predetermined plane.

Referring first to Fig. 1 for a more detailed description of my invention, I position a fruit such as a peach 1 within a pair of opposed clamp arms 2, only one of which is shown, with the stem indent down. This prior orientation of the fruit may be accomplished automatically, for example, by the cup and rotating wheel shown, described and claimed in Patent No. 2,220,511. Fruit in this position with the stem indent down will, however, have the seam 4 of the fruit in no particular vertical plane and may be presented with the seam in any position. The clamp arms, with the orientated fruit held therein are moved by a suitable carrier, into a predetermined location, for further operation upon the fruit.

Immediately above the fruit held in clamp arms 2 at this predetermined location is positioned an upper hollow cone 5 mounted on upper shaft 6 and urged downwardly by spring 7 bearing against stationary shaft bearing 8. Upper cone 5 is movable vertically by means of yoke 10 and in this figure is at its uppermost position. The periphery of upper cone 5 is circular and is provided with teeth 11 meshing with the elongated upper gear 12 which is mounted on drive shaft 13.

Figure 6:
Fig. 6 is a top plan view of the pilot member.

Immediately below the fruit is positioned a hollow seat cone 15, also provided with peripheral teeth 16 meshing with lower elongated gear 17 mounted on shaft 13. Seat cone 15 is vertically movable by lower yoke 20 attached to slide 21 mounted in stationary guide ways 22'. Thus, both upper cone 5 and lower seat cone 15 are capable of being rotated by gears 12 and 17, respectively, and are also capable of being moved toward and away from each other. In Fig. 1, the lower cone 15 is shown at its lower limit of vertical travel, so that a fruit 11 may be received between cones 5 and 15. Cone 15 is provided with a lower aperture 22 into which a pilot pin 23 projects; this pilot pin having an ovally contoured end as shown in Fig. 6. Pilot pin 23 is a part of lever arm 24 pivoted to slide 21 on pivot pin 26. Lever arm 24 also has an extension 27 extending outwardly beyond pilot pin 23 to terminate in a tip 30 and a boss 31 of insulating material extending upwardly. Pilot pin 23 is forced upwardly by pilot pin spring 34 bearing against spring retainer 35 also mounted on slide 21. Thus, when slide 21 is reciprocated vertically by any convenient mechanism synchronized with the remaining mechanism it carries with it seat cone 15, lever arm 24, pilot pin spring 34, and spring retainer 35.

Returning to the structure above the peach, drive shaft 13 is mounted on spaced bearings 40 and extends upwardly beyond elongated gear 12 through a clutch 41 operated by clutch arm 42, the clutch being normally held closed by clutch spring 44 and opened by the action of a solenoid 45, this solenoid attracting clutch arm 42 when energized. The upper portion of main drive shaft 13 is rotated through bevel gears 46 by a motor 47, this motor being energized for continuous rotation by current mains 50.

Continuing the description of the electrical system, solenoid 45 is connected to one side of the line by connection 51. The other electrical end of the solenoid is connected through a cam switch 52 operated by cam 53 continuously rotated in synchronism with slide 21, and the opening and closing of clamp arms 2. Cam 53 bears on switch cam follower 54. Cam 53 is divided into four quadrants A and B being low quadrants, C and D being high quadrants, as shown in Fig. 7. The circuit continues through switch 52 to one contact 57 of a pilot switch 58, the other contact 59 of this pilot switch being connected by wire 60 to the other side of the line 50. Thus, in order for solenoid 45 to be energized, both switches 52 and 58 must be closed. In parallel, however, around switch 58 I connect a slide switch 62 having opposed contacts 63 bridged by a moving contact 64, mounted on, but electrically isolated from, the lower end of slide 21. Pilot switch 58 is mounted on an indexing frame 65, provided with a longitudinal slot 66 therein so that the indexing frame 65 may move vertically on stationary pins 67 and stay in any position on pins 67 by friction applied through friction spring 70 mounted on a stationary portion 71 of the frame of the machine.

Indexing frame 65 is provided at the top, adjacent switch 58 with a shoulder 72 which is contacted by terminal 30 of lever arm 24, and when so contacted boss 31 on lever arm 24 closes switch 58. On the opposite side of the indexing frame 65 is positioned an oscillating cam 75 which contacts a lug 76 mounted on frame 65 to reset the frame, as will be described later. This oscillating cam is tied in with the synchronized operation of the slide 21.

Having described the mechanics and electrical system of my device as shown in the drawings, I will now describe its operation in sequence for one complete cycle, beginning and ending with the condition shown in Fig. 1.

In Fig. 1 as above stated, the peach 1 is held by the clamp arms 2 between the retracted upper cone 5 and seat cone 15 as the carrier stops. The motor 47 will be running and will be turning the upper portion of drive shaft 13 but will not be turning the lower portion because clutch 41 is open, as solenoid 45 is energized. This energization is due to the fact that cam 53 has closed switch 52. Boss 31 has closed switch 58 because resetting cam 75 has just returned frame 65 to its lowermost position. Switch 62 is also closed. Thus, the cones 5 and 15 are not rotating.

The next step in the operation of the device is shown in Fig. 2. The upper and lower cones have been progressed towards each other until the fruit is gripped between them. Clamp arms 2 have released the fruit. The fruit is now being rotated because cam 53 has rotated a sufficient distance to allow switch 52 to open. This opening has deenergized solenoid 45, allowing spring 44 to apply power through the clutch 41. At the same time slide switch 62 has become open due to the rise of slide 21. Resetting cam 75 has moved upwardly out of the way of indexing frame 65. Cam 53 is so geared that the peach will make two full revolutions while cam 53 is making one.

In Fig. 2 the pilot pin 23 does not yet fit the stem indent of the fruit and therefore is lower in position than it will be when it registers with the stem indent. After a quarter revolution of the fruit from the position shown in Fig. 2, the pilot pin will be able to enter the stem indent properly, and as the pilot pin 23 rises to fully enter the stem indent, tip 30 carries indexing frame 65 with it. This condition is shown in Fig. 3 taken one-quarter revolution after the condition shown in Fig. 2. In this figure the pilot pin has entered the stem indent to its fullest extent, thus raising indexing frame 65 to a point determined by the entrance depth. This is the sensing action to preset frame 65. The fruit is still being rotated as the clutch is still closed.

Figure 4:
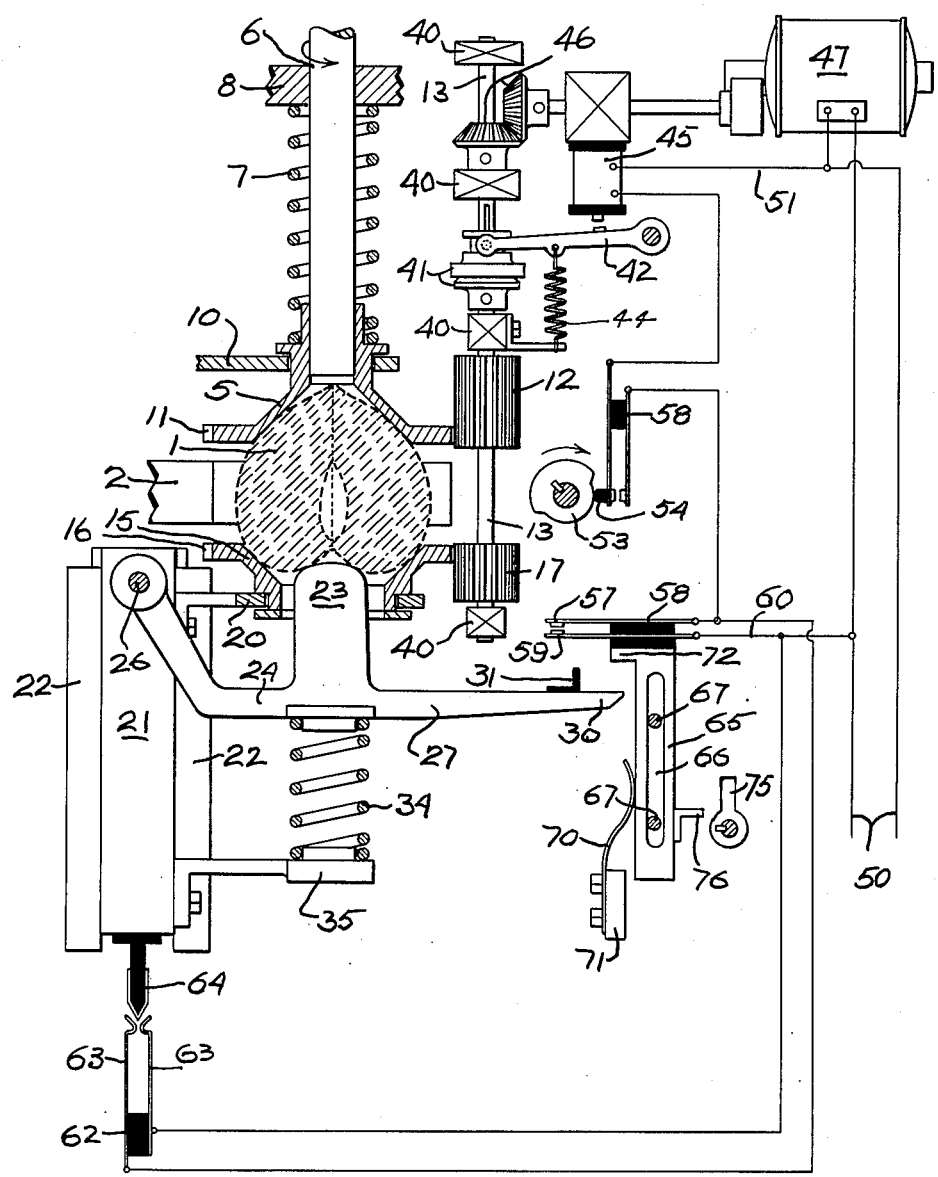

The machine condition one quarter revolution after the condition shown in Fig. 3 is shown in Fig. 4. Here the pilot pin has been forced partially out of the stem indent of the fruit because the fruit has rotated so that the pilot pin does not fit it. But as the pilot pin is forced out of the fruit, it leaves the indexing frame 65 in the uppermost position to which it was brought by tip 30 and switch 58 is open as well as switch 52. In this position however, cam 53 is about to close switch 52.

The next quarter revolution of the fruit is shown in Fig. 5. Here the fruit is rotated until the pilot pin 23 has again entered the stem indent, and as it has risen to the same depth that it entered on the sensing movement, tip 30 has again closed switch 58 on indexing frame 65, without however having changed its position. Cam 53 however, has by this time also closed switch 52. Both switches 52 and 58 being closed at the same time, solenoid 45 is energized, and the clutch 41 is opened. All fruit revolution ceases because the stem indent of the fruit is in proper registry with the pilot 23, holding the fruit in registered position. Clamp arms 2 are then closed to hold the fruit and the cones 5 and 15 moved apart to the position shown in Fig. 1 releasing the fruit. The carrier may then move out the fruit orientated with regard to the same, and move a new fruit into position in readiness for the next cycle. At the same time as slide 21 moves downwardly resetting cam 75 is moving to reset the indexing frame 65. While it might be possible to so coordinate the downward movement of the slide 21 and indexing frame 65 to keep switch 57 closed, I prefer to bridge frame switch 58 by slide switch 62 which closes as soon as the slide starts downwardly thus maintaining the solenoid circuit closed irrespective of the condition of the indexing switch 58 during the resetting of the frame 65.

It will be obvious however, that fruit I is never delivered between cones 5 and 15 with the seam in exactly the same plane. Therefore, when cones 5 and 15 approach the fruit to hold it, the fruit will be held in a position which can vary, with regard to the desired seam plane, over an arc of just less than one-half a revolution of the fruit. Irrespective of the seam position however, rotation of the fruit will not start until cam 53 allows switch 52 to open. The solenoid circuit will not be first opened by switch 58 at any time because as the fruit is taken over by cones 5 and 15, lever arm 24 has moved upwardly and is holding switch 58 closed, and will continue to do so until rotation starts. This closure may be called the first closure of switch 58 in the cycle.

When cam 53 opens switch 52 by cam follower 54 entering quadrant A, as shown in Fig. 7, the solenoid 45 is deenergized, the clutch closes and rotation begins. After one-half revolution of cam 53, cam follower O enters quadrant C and switch 52 becomes closed. Any closure thereafter of switch 58 stops the fruit from rotating further because both switches 52 and 58 in series control the solenoid. Rotation may cease immediately switch 52 closes, or, if the pilot pin has at that time not entered fully into the stem indent, then fruit rotation will continue even though switch 52 is closed, until the pilot pin 23 reenters the stem indent to its fullest extent. This closes both switches and rotation will stop.

Thus, there will be, after switch 52 closes, a variance in the time when the fruit will stop rotating. Cam 53 rotates only once, for two full revolutions of the fruit, and at the maximum, only slightly less than one and one-half full revolutions of the fruit are necessary for both sensing and final action. The fruit always stops rotating when the switch cam follower 54 is within quadrant C of the cam 53, leaving the time involved in the travel of the cam follower 54 over quadrant D for changing the fruit.

The release of the fruit by arms 2 and the pickup of the fruit by the cones 5 and 15 are so interlinked with the driving mechanism of the cam 53, as to withdraw the cones from the fruit at the beginning of the cam follower contact with quadrant D of cam 53. Thus, the fruit will always start rotating with the cam follower entering quadrant A of cam 53, but will stop rotating at any time during the passage of the cam follower over quadrant C thereof.

Some fruits will have the first entrance of the pilot pin into the stem indent immediately after the start of rotation, the pilot pin will then be forced out of the stem indent by the contour thereof, and switch 58 opened, but switch 52 is also open, and the next one-half turn of the fruit will then close switch 58 for the second time. This intermediate entering of the pilot pin is not used as when this occurs cam 53 will not yet have closed switch 52 as the cam follower is in quadrant B. Consequently, the fruit keeps on rotating and by the time the next one-half turn has occurred the cam follower will have just entered quadrant C, switch 52 will have closed and rotation will cease. Thus only slightly more than one fruit revolution will have occurred.

Assume the other extreme case, where almost a complete one-half revolution of the fruit occurs before sensing. In this case the intermediate entering of the pilot pin and the second closure of switch 58 will also take place with cam follower on quadrant B, before cam 53 has closed switch 52. An additional half revolution will again occur, so that the rotation will not cease until the cam follower is almost off quadrant C of cam 53. In this latter case, a little less then one and one-half turns have been made by fruit I. Inasmuch as the seam 4 can only be less than one-half revolution away from the first sensing action, the 2:1 rotation ratio between the fruit and cam 53 fully takes care of all variance in initial position, leaving the last full quadrant D of cam 53 available for fruit transfer. Both switches will be closed at the same time in slightly more then one fruit revolution as a minimum and slightly less than one and one-half revolutions as a maximum, and rotation cessation always takes place when the cam follower is on quadrant C.

It will be noticed that I make no attempt to position the seam 4 of the fruit in a definite directional position with the seam adjacent for example, the gears 12 and 17. All that is desired is that the seam be in a predetermined plane and the seam will be 180° apart between sensing and final position. This is not important however, because the entire device has been built to present the fruit for splitting along the seam plane coinciding with the greatest area plane of the pit of the fruit, and it is not important during any such splitting operation whether the seam is on one side or the other of the fruit.

Thus it will be seen that I obtain seam orientation by utilizing the stem indent contour only, and that I am able to properly orientate seamed fruit even when the actual depth of the stem indent varies greatly.

I claim:

1. Means for orientating seamed fruit having a stem indent elongated laterally in the plane of the seam comprising driving means for rotating said fruit about an axis passing through the stem indent, a pilot member having a terminal contour fitting the elongation of said indent, means for urging said pilot against said stem indent area during fruit rotation, and means operated by the motion of said pilot member when fully entering said stem indent for stopping rotation of said fruit by said driving means.

2. Means for orientating seamed fruit having a stem indent elongated laterally in the plane of the seam comprising driving means for rotating said fruit about an axis passing through the stem indent, a pilot member having a terminal contour fitting the elongation of said indent, means for urging said pilot against said stem indent area during fruit rotation, primary rotation control means movable by said pilot member upon entrance thereof fully into the stem indent, means for holding said rotation control means in the position as determined by movement of said pilot member, and secondary control means operating in response to the movement of said primary control means for stopping rotation of said fruit by said driving means upon a subsequent full entrance of said pilot member into said stem indent.

3. Means for orientating seamed fruit having a stem indent elongated laterally in the plane of the seam comprising driving means for rotating said fruit about an axis passing through the stem indent, a pilot member having a terminal contour fitting the elongation of said indent, means for urging said pilot against said stem indent area during fruit rotation, primary rotation control means movable by said pilot member upon entrance thereof fully into the stem indent, means for holding said rotation control means in the position as determined by movement of said pilot member, secondary control means for operating in response to the movement of said primary control means for stopping rotation of said fruit by said driving means upon a subsequent full entrance of said pilot member into said stem indent and means for removing fruit in the position assumed at cessation of rotation.

4. Means for orientating seamed fruit having a stem indent elongated laterally in the plane of the stem comprising driving means for rotating said fruit about an axis passing through the stem indent, a pilot member having a terminal contour fitting the elongation of said indent, means for urging said pilot against said stem indent area during fruit rotation, primary rotation control means movable by said pilot member upon entrance thereof fully into the stem indent, means for holding said rotation control means in the position as determined by movement of said pilot member, secondary control means for operating in response to the movement of said primary control means for stopping rotation of said fruit by said driving means upon a subsequent full entrance of said pilot member into said stem indent, and means for holding fruit in the position assumed at cessation of rotation.

5. Means for orientating seamed fruit having a stem indent elongated laterally in the plane of the seam comprising driving means for rotating said fruit about an axis passing through the stem indent, a pilot member having a terminal contour fitting the elongation of said indent, means for urging said pilot against said stem indent area during fruit rotation, primary rotation control means movable with said pilot member upon entrance thereof fully into the stem indent, means for holding said rotation control means in the position as determined by movement of said pilot member, secondary control means for operating in conjunction with said primary control means for stopping said driving means upon a subsequent full entrance of said pilot member into said stem indent, means for holding fruit in the position assumed at cessation of rotation, means for removing said pilot member and means for resetting said primary control means.

6. Means for orientating seamed fruit comprising opposed hollow cones, resilient means forcing said cones against a fruit positioned between said cones with the stem indent of the fruit axially facing the interior of one of said cones, said latter cone being cut away to expose the stem indent, a pilot member resiliently applied to said stem indent, said pilot member having an elongated terminal contour generally fitting the stem indent contour, a motor, clutch means for rotating said cones and said fruit by said motor with respect to said pilot member to cause said pilot member to move in and out of said stem indent, a frame carrying a frame switch, an arm attached to said pilot member for moving said frame during entrance into said stem indent only, a frame switch operating boss on said arm closing said frame switch before said frame is moved, a second switch in series with said frame switch, clutch control means operating to open said clutch when both switches are closed at the same time, and a cam rotated to operate said second switch.

7. Means for orientating seamed fruit comprising opposed hollow cones, resilient means forcing said cones against a fruit positioned between said cones with the stem indent of the fruit axially facing the interior of one of said cones, said latter cone being cut away to expose the stem indent, a pilot member resiliently applied to said stem indent, said pilot member having an elongated terminal contour generally fitting the stem indent contour, a motor, clutch means for rotating said cones and said fruit by said motor with respect to said pilot member to cause said pilot member to move in and out of said stem indent, a frame carrying a frame switch, an arm attached to said pilot member for moving said frame during entrance into said stem indent only, a frame switch operating boss on said arm closing said frame switch before said frame is moved, a second switch in series with said frame switch, clutch control means operating to open said clutch when both switches are closed at the same time, and a second switch control cam having equal switch closing and opening segments thereon, said control cam being rotated at one half the speed of said fruit.

8. Apparatus in accordance with claim 6 wherein said cam first opens said second switch at the time said pilot is presented to said stem indent.

ELLSWORTH W. CARROLL.